June 17, 1947. L. ORLAND 2,422,433
ADJUSTABLY MOUNTED MOTOR
Filed Aug. 17, 1944
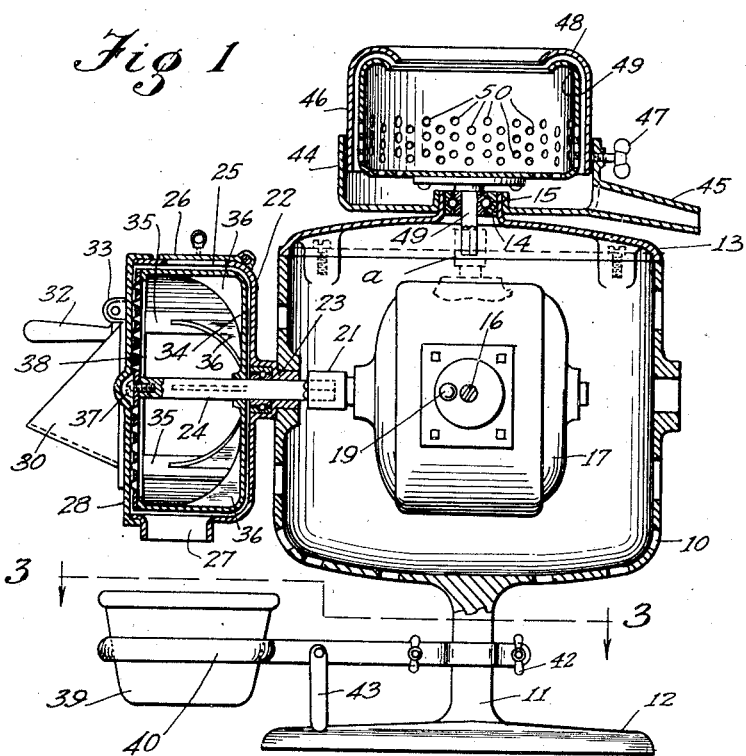
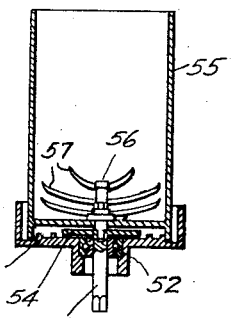
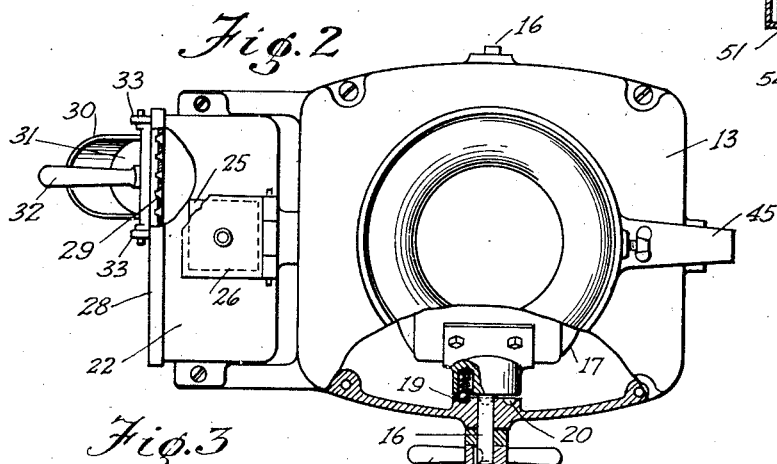
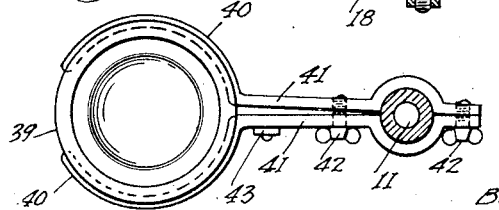
INVENTOR
LOUIS ORLAND
By Martin O. Smith
ATTY.

Patented June 17, 1947

2,422,433

UNITED STATES PATENT OFFICE 2,422,433

ADJUSTABLY MOUNTED MOTOR

Louis Orland, Los Angeles, Calif.

Application August 17, 1944, Serial No. 549,818

5 Claims. (Cl. 172—36)

My invention relates to an adjustably mounted motor especially designed for use in connection with the fruit and vegetable shredding, slicing and juice extraction machine of the particular type disclosed in my copending patent application filed June 12, 1943, Ser. No. 490,852, and the principal objects of my present invention are, to generally improve upon and simplify the construction of the machine forming the subject of said copending application, as well as other existing forms of similar machines and further, to provide the machine with driving means in the form of an electric motor which is mounted so as to rotate on a horizontal axis in order that rotary motion and power may be delivered to the horizontal shafts of machine elements or accessories, thus enabling the machine to be used for conveniently and economically performing a number of different operations, for instance, the shredding, slicing, grating or disintegrating of fruits, vegetables and other foodstuffs, the extraction of juices from the grated or comminuted products, the liquifying of relatively soft juice containing fruits and vegetables and for the washing of the products before same are acted upon by the machine.

With the foregoing and other objects in view, my invention consists in certain novel features of construction and arrangement of parts which will be hereinafter more fully described and claimed and illustrated in the accompanying drawings in which:

Fig. 1 is a vertical section taken through the center of my improved machine.

Fig. 2 is a top plan view with parts broken away.

Fig. 3 is a horizontal section taken on the line 3—3 of Fig. 1.

Fig. 4 is a vertical section taken through the center of the attachment used for liquifying juice containing foods.

Referring by numerals to the accompanying drawings which illustrate a preferred embodiment of my invention, 10 designates a housing, supported by post 11, projecting upwardly from base 12 and 13, a removable top piece for said housing, which top piece is provided with a centrally disposed flanged opening 14, occupied by an antifriction bearing 15.

Trunnions 16 journalled in opposite walls of housing 10 provide a horizontal axis for an electric motor 17, one of said trunnions being extended and carrying a removable handle 18 by means of which the motor may be rotated.

A spring pressed ball 19, carried by a part of the motor housing, is adapted to engage in apertures 20 formed in the inner face of the adjacent wall of housing 10 and acts as a detent to maintain the motor in different set positions.

One end of the motor shaft carries a socket 21 which receives the ends of the shafts of different attachments used on the machines. The attachment for shredding, grating or slicing foodstuffs includes a housing, 22, the rear wall of which has a central bearing 23 which is removably positioned in one of the walls of housing 10, in the same horizontal plane with the trunnions 16 and journalled in said bearing, is a horizontal shaft 24, the inner end of which is removably seated in socket 21.

Formed in the top of the circumferential side wall of housing 22 is an opening 25 normally closed by door 26 and formed in the bottom of said wall is a discharge opening 27.

Housing 22 is provided with a removable outer end wall 28 having an opening 29 to one side of its center and secured to said wall below said opening is a short inclined chute 30.

A product pressure plate 31 provided with a handle 32 is hinged at 33 to plate 28 above opening 29, thus proving simple means for forcing foodstuffs through chute 30 and opening 29, into engagement with the shredding or slicing member within housing 22.

The body of a member carried by shaft 24, may include a rear or inner wall 34, positioned adjacent the rear wall of housing 22 and projecting from the edge of said rear wall, adjacent the circumferential side wall of said housing are arms 35 and webs 36 which function as agitators or stirring means for the comminuted product within housing 22.

Detachably secured to the outer end of shaft 24 by a screw 37 is a shredding, grating or slicing disc 38, which rotates in a plane parallel with and adjacent wall 28.

A suitable receptacle 39, for the product as it discharges from outlet 27 is supported by the spaced end portions 40 of arms 41, which are clamped to post by thumb screws 42 (see Fig. 3) and said arms and receptacle being supported on base 12 by a folding leg 43.

The juice extractor accessory includes a shallow receptacle 44 supported on the flange around opening 14, in the top of housing 10 and having a discharge spout 45.

The lower end of a circular wall 46 is positioned in the upper portion of receptacle 44 and clamped thereto by a set screw 47 and the upper portion of said wall is extended inward to provide a flange 48.

Removably seated in the inner ring of bearing 15 is a short vertical shaft 49, the lower end of which is adapted to engage in socket 21 on the end of the motor shaft when same is in a vertical position, as shown in Fig. 1.

Carried by the upper end of shaft 48, within wall 46 is a receptacle 49, the lower portion of the wall of which is perforated as designated by 50.

The liquefier accessory illustrated in Fig. 4 includes a plate 51 removably applied to the flange on housing 10 around opening 14, said plate having an anti-friction bearing 52 for a short vertical shaft 53 adapted to be connected to socket 21 of the motor shaft.

A packing disc 54 is carried by the upper end of shaft 53 above plate 51 bearing 52 and removably positioned on plate 51 is a receptacle 55, in the bottom of which is journalled a short shaft 56, the lower end thereof having driving connection with the upper end of shaft 53.

Carried by shaft 56 within the lower portion of receptacle 55, is a series of radially disposed combined cutting and stirring blades 57.

When the machine is used for grating, slicing, grinding or shredding fruits, vegetables or like foodstuffs housing 22 is applied to housing 10 with shaft 24 connected to the motor shaft as seen in Fig. 1.

The product to be acted upon is placed in chute 30 and pressed against the face of the grating, cutting or abrading disc 33 and the cuttings after being agitated and mixed by arms 35 and vanes 36 discharge through opening 27 into receptacle 39.

To use the juice extractor, the motor is turned by means of handle 18 so that the motor is vertically disposed and thus, when shaft 49 is connected to the motor shaft and the motor is operated, receptacle 49 will be rotated, and thus extract, by centrifugal force, the juices from the comminuted or crushed product within said receptacle and said juices pass into receptacle 44 and discharge therefrom through spout 45.

To liquify soft fruits and vegetables such as apples, grapes, peaches, pears, berries, tomatoes, spinach and the edible portions of oranges, grapefruit and melons, the liquifier shown in Fig. 4 replaces the juice extractor on housing 10 and the revolving blades and fingers 57, rapidly converts the product to liquid or semi-liquid and which conversion may be enhanced by the addition of water, milk or syrup.

Thus it will be seen that I have provided a fruit and vegetable shredding, slicing and juice extracting machine which is simple in structure, inexpensive to manufacture and very effective in performing the functions for which it is intended.

It will be understood that minor changes in the size, form and construction of the machine as herein disclosed may be changed in minor details without departing from the spirit of the invention, the scope of which is set forth in the appended claims.

I claim as my invention:

1. The combination with a housing having a plurality of openings for the accommodation of parts of operating structures, of a motor mounted to rotate bodily within said housing so as to selectively align the shaft of said motor with said openings.

2. The combination as set forth in claim 1 and means for releasably anchoring said motor to said housing in predetermined positions.

3. The combination as set forth in claim 1, with manually operable means for rotating said motor on its axis.

4. The combination with a housing provided in its walls with openings for the accommodation of the shafts of operative structures located on the exterior of the housing, of a motor mounted to rotate bodily with said housing, said motor including a shaft and means whereby the shafts of the operative structures may be detachably connected to the motor shaft.

5. The combination as set forth in claim 4, with means for releasably anchoring said motor to said housing in predetermined positions.

LOUIS ORLAND.

REFERENCES CITED

The following references are of record in the file of this patent:

UNITED STATES PATENTS

| Number | Name | Date |
| --- | --- | --- |
| 1,757,326 | Miller | May 6, 1930 |
| 2,195,100 | Smith | Mar. 26, 1940 |
| 2,273,093 | Drachenberg | Feb. 17, 1942 |
| 2,289,656 | Knapp | July 14, 1942 |
| 2,315,018 | Lawrence | Mar. 30, 1943 |
| 2,046,784 | Krause | July 7, 1936 |
| 2,290,379 | Peterson | July 21, 1942 |